(12) United States Patent
Efron et al.

(10) Patent No.: US 6,862,429 B2
(45) Date of Patent: Mar. 1, 2005

(54) AUDIO PRODUCTION, SATELLITE UPLINK AND RADIO BROADCAST STUDIO

(76) Inventors: Edward Efron, 10550 Habersham Ct., Las Vegas, NV (US) 89123; Gene Harris, Jr., 4028 Broadriver Dr., Las Vegas, NV (US) 89109

( * ) Notice: Subject to any disclaimer, the term of this patent is extended or adjusted under 35 U.S.C. 154(b) by 512 days.

(21) Appl. No.: 09/771,039

(22) Filed: Jan. 26, 2001

(65) Prior Publication Data

US 2003/0008627 A1 Jan. 9, 2003

(51) Int. Cl.[7] .................................................. H04H 1/00
(52) U.S. Cl. ........................ 455/3.06; 455/3.02; 381/80; 381/82; 381/104
(58) Field of Search ............................. 455/3.06, 3.02, 455/72; 381/80, 82, 104, 107, 119, 94.4, 303, 56, 102

(56) References Cited

U.S. PATENT DOCUMENTS

| | | | | |
|---|---|---|---|---|
| 3,668,322 A | * | 6/1972 | Allen et al. | 381/102 |
| RE30,278 E | * | 5/1980 | Stumpf et al. | 381/61 |
| 4,501,014 A | * | 2/1985 | Bluthgen | 381/94.4 |
| 4,528,501 A | * | 7/1985 | Dorrough et al. | 381/56 |
| 4,879,751 A | * | 11/1989 | Franks et al. | 381/119 |
| 5,063,610 A | * | 11/1991 | Alwadish | 455/45 |
| 5,239,540 A | * | 8/1993 | Rovira et al. | 370/345 |
| 5,293,633 A | * | 3/1994 | Robbins | 455/72 |
| 5,333,202 A | * | 7/1994 | Okaya et al. | 381/303 |
| 5,579,537 A | * | 11/1996 | Takahisa | 455/3.06 |
| 5,668,884 A | * | 9/1997 | Clair et al. | 381/82 |
| 5,751,819 A | * | 5/1998 | Dorrough | 381/119 |
| 5,852,800 A | * | 12/1998 | Modeste et al. | 381/119 |
| 6,148,175 A | * | 11/2000 | Freedland | 455/3.06 |
| D452,391 S | * | 12/2001 | Efron et al. | D6/422 |
| 6,600,898 B1 | * | 7/2003 | De Bonet et al. | 455/3.04 |

* cited by examiner

*Primary Examiner*—Edward F. Urban
*Assistant Examiner*—Lana Le
(74) *Attorney, Agent, or Firm*—Roy A. Ekstrand (57) ABSTRACT

An audio production, satellite uplink and radio broadcast studio system includes an audio console having a supporting meter bridge and editing unit operative under the control of a central or main computer. The audio console is coupled to a plurality of analog audio information sources including a plurality of microphones, a plurality of telephone lines, a radio broadcast tuner and a plurality of audio tape drives. The audio console is further coupled to a plurality of digital information sources including a pair of ISDN lines, a plurality of compact disc players, a mini-disc player and a remotely operated digital audio recorder. The computer is coupled to the audio console via an interface and sound card. The audio console is coupled to a plurality of program outputs having different program format capabilities and to a distribution amplifier operative to control the various remotely operated recording apparatus within the system.

2 Claims, 5 Drawing Sheets

AUDIO PRODUCTION, SATELLITE UPLINK AND RADIO BROADCAST STUDIO

FIELD OF THE INVENTION

This invention relates generally to audio studio systems and particularly to systems utilized in the creation, processing and communicating of audio program materials for use in radio broadcasting.

BACKGROUND OF THE INVENTION

The basic operation of commercial radio broadcast stations is well known and well established in the art. In essence, broadcast stations function to create, purchase or otherwise acquire program material, often referred to as "content" or "content material" and to broadcast such program material. The broadcast station's goal is to provide program material which is of interest to radio listeners in order to motivate radio listeners toward selection of the station's programming. The overall motivation of creating or obtaining interesting and desirable program materials is rooted in the broadcast station's desire to sell advertising time in connection with such programs to various product or service advertisers.

In many instances, a number of radio stations are associated and/or combined in their operations through various groupings such as affiliations, common ownerships, network memberships or similar combinations. One of the advantages of such combinations or groupings, is found in the availability of shared program materials between related stations.

Because competition for radio listeners is active and intense, and because a given radio station's ability to sell advertising time at a profit is usually related directly to its listener base, radio stations have an enormous appetite for program material and program content. In many radio stations, a significant portion of the program material used to fill the broadcast schedule is created or produced by the staff members and artists of the radio station. While substantial variation of program material and content is available between different radio stations, many typical radio stations create their own program materials for content such as news and music programming. News and music programming often operates live during commuter time slots and relies upon real time newsbreaks, disc jockeys, weather and traffic updates together with pre-recorded music. Other typical program materials and content created by radio stations may involve live coverage of events such as sporting events or other events such as "late breaking news" which are best served by real time live coverage.

Notwithstanding a radio stations capability to produce and create significant amounts of program materials, an ever increasing number of radio stations have been compelled to obtain program materials or content from outside producers to fill out the broadcast day. These outside producers, often referred to as "content providers" generally operate as independent producers selling program material to a number of radio broadcasters. One factor driving this shift toward content providers is found in the reduction of staff occurring in many radio stations in response to economic pressures. As competition and economic pressures combine to force radio broadcast stations to reduce operating expenses, many radio stations have been forced to reduce their artistic and creative staff. This, in turn, has created a content void and a depletion of program content quality.

In response to the critical need for high quality program materials and program content, practitioner's in the radio art have created radio networks and studios which function as content providers rather than, as traditional, radio broadcasters. Such content providers are in the business of creating, marketing and supplying program content to radio broadcasters.

Production studios operated by such content providers often utilize relatively basic audio studio systems to produce program materials. The content providers then package the content material, format the material and transfer it to one or more radio broadcasters. One of the serious limitations facing production studio operators is found in the lack of efficient audio production, audio processing and communication systems. of necessity, program material provided for radio broadcast must be extremely clear and high in quality to meet consumer demands.

Unfortunately, production studio operators and content providers are, for the most part, forced to utilize service providers and contracted facilities which are dispersed and widely separated. Typically, different services and facilities are owned and operated by independent providers. This dispersal and separation of service providers used by production studio operators and content producers, in turn, requires that audio materials be transferred between several service providers and facility locations. The result is often excessive production costs, reduced studio efficiency and reduced quality of program materials and content.

There arises therefore, a continuing and unfulfilled need in the art for more effective audio production, satellite uplink and radio broadcast studios which overcome the foregoing described deficiencies of prior art systems. There arises a concurrent need in the art for improved audio production, satellite uplink and radio broadcast studios which are efficient and effective for operation by radio broadcast stations and operation by content providers.

SUMMARY OF THE INVENTION

Accordingly, it is a general object of the present invention to provide a new and improved audio production, satellite uplink and radio broadcast studio. It is a more particular object of the present invention to provide a new and improved audio production, satellite uplink and radio broadcast studio which forms an integrated multiple function system enabling a single studio operator to perform the entire creation, mixing, editing, mastering, configuring and processing of audio program materials as well as the transferring of completed program content to radio broadcasters using fixed media such as compact disks and/or electronic communication via internet and/or satellite communication systems.

In accordance with the present invention there is provided an audio production, satellite uplink and radio broadcast studio comprising: an audio console having a plurality of analog information inputs, a plurality of digital information inputs, a plurality of audio outputs and a computer interface; a meter bridge responsive to and coupled to the audio console having means for displaying a plurality of audio tracks; a multi-function editing unit coupled to the audio console; a computer having means for storing and running one or more operating software systems and studio operator input means, the computer being coupled to the audio console via the computer interface; a telephone interface coupled to the audio console having a plurality of telephone lines connected thereto; and a microphone interface coupled to the audio console having a plurality of microphones connected thereto, the audio console, the meter bridge and the multi-function editing unit operative under control of the computer to allow a single studio operator to create, assemble, multi-track, configure, master and format a plurality of audio segments and subsegments to produce a complete audio program piece.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

DESCRIPTION OF THE PREFERRED EMBODIMENT

Figure 1:
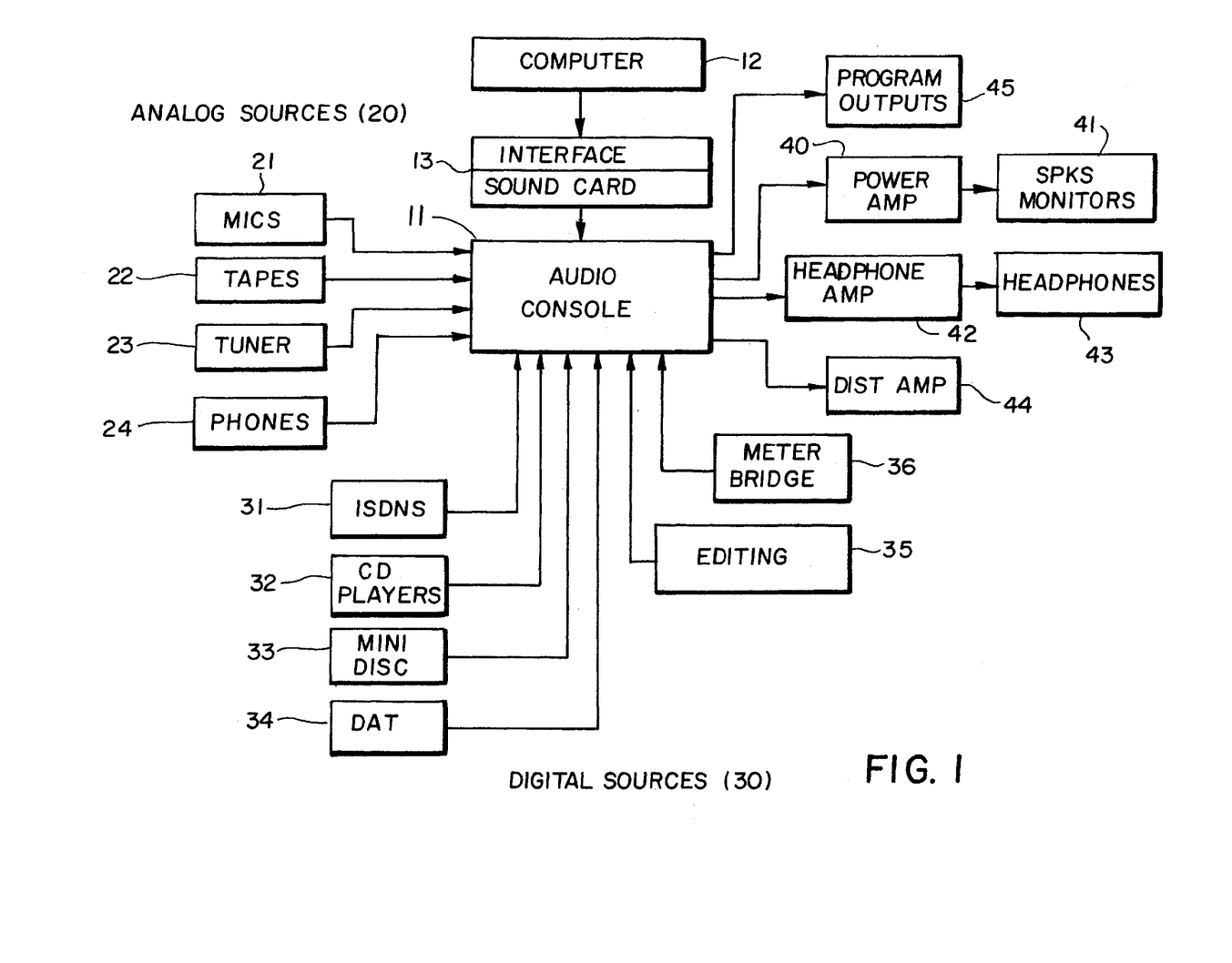
FIG. 1 sets forth a simplified block diagram of the present invention studio system.

FIG. 1 sets forth a simplified block diagram overview of the present invention audio production, satellite uplink and radio broadcast studio generally referenced as studio system 10. The purpose of FIG. 1 is to set forth a general overview of the present invention studio system. Accordingly, system 10 includes an audio console 11 which is operatively coupled to a computer 12 by an interface 13. Interface 13 includes conventional digital interface circuitry such as a conventional sound card and the like. Console 11 is further coupled to and controlled by an editing unit 35 and a meter bridge 36. A plurality of analog sources 20 which, for example, may include a plurality of microphones 21, one or more analog tape units 22, one or more tuners 23 and a plurality of telephone inputs 24 are operatively coupled to analog input ports of console 11. Similarly, a plurality of digital information sources generally referenced by numeral 30 which may include for example one or more ISDN lines 31, one or more compact disc (CD) players 32, one or more mini disc players 33 and a remotely operable recorder 34 are coupled to respective digital signal inputs of console 11.

Console 11 defines a plurality of output ports which are utilized in supplying output to a power amplifier 40, a headphone amplifier 42, and a distribution amplifier 44. Power amplifier 40 is further coupled to a plurality of speakers and studio monitors 41 while headphone amplifier 42 is further coupled to a plurality of headphones 43.

In operation and by means set forth below in greater detail, a single studio operator is able to completely control system 10 and to perform the accumulation and combination of audio information from the plurality of available analog and digital sources and is able to perform all of the required functions for producing the desired program material which is then transferred from audio console 11 to one or more of a plurality of program outputs 45. Program outputs 45 may, for example, include one or more conventional audio signal feeds or may further include a satellite uplink system which facilitates the direct transfer of program material to any number of receiving stations having satellite download capability. By way of further example, program outputs 45 may include interfaces for applying the output program material from console 11 to one or more ISDN lines (for example ISDN lines 31) to directly communicate digitally encoded program information.

The inputting process to system 10 is provided as analog information is communicated to console 11 which is produced by microphones 21, tape drives 22, tuner 23 and/or phone lines 24. The analog information inputted to console 11 is preferably converted by conventional analog to digital converters to digitally encoded information for processing. Similarly, additional information to be utilized in putting together the desired program information may be applied to console 11 in digital format via ISDN lines 31, CD player 32, mini disc player 33 and/or remotely controlled recorder 34. Once the desired elements or components of the to-be-formed program information have been inputted or made available to console 11, the operation of console 11 is controlled by the cooperation of computer 12 and the operator inputs using editing unit 35 and meter bridge 36.

The manner in which a single operator manipulates editing unit 35 and meter bridge 36 to utilize computer 12 and audio console 11 to put together the desired program information is set forth below in FIGS. 2A, 2B, 3A and 3B in greater detail. However, suffice it to note here that in accordance with an important aspect of the present invention, a single operator manipulating editing unit 35 and meter bridge 36 is able to draw information from both analog sources 20 and digital sources 30 which may then be rough edited and utilized in building a multi-track format of the desired elements of the program material. Additionally, supplemental material such as sound effects, theme music and crowd noise may be combined with the multi-track formatted material which is then subjected to a finish editing and mixing and mixdown operation to provide the basic program material suitable configuration into the desired output format.

The operator is then able to initiate the configuration process by normalizing and peak limiting the program material and by equalizing and compensating the material to enter the mastering or processing configuration operation. Thereafter, this same operator utilizing the present invention system is able to configure and output the finished program material in virtually any suitable output configuration. Such output configurations may, for example, include direct ISDN transfer to broadcasters, compact disc burning or printing, protocol configurations for use in cable modem transfer such as MP3 conversion, and additional specialized formats such as program material formats which remove commercial information to produce commercial-free program materials. Of importance with respect to the present invention is the ability of a single studio operator to perform the entire production studio operation, program creation and program content output procedures completely independent of additional staff or additional facilities use. In this manner, the present invention studio system provides a substantial improvement in the efficiency and cost effectiveness of a content provider such as the above-mentioned independent content providers as well as an extremely efficient production studio for use in a more conventional radio broadcast operation.

Figure 2A:
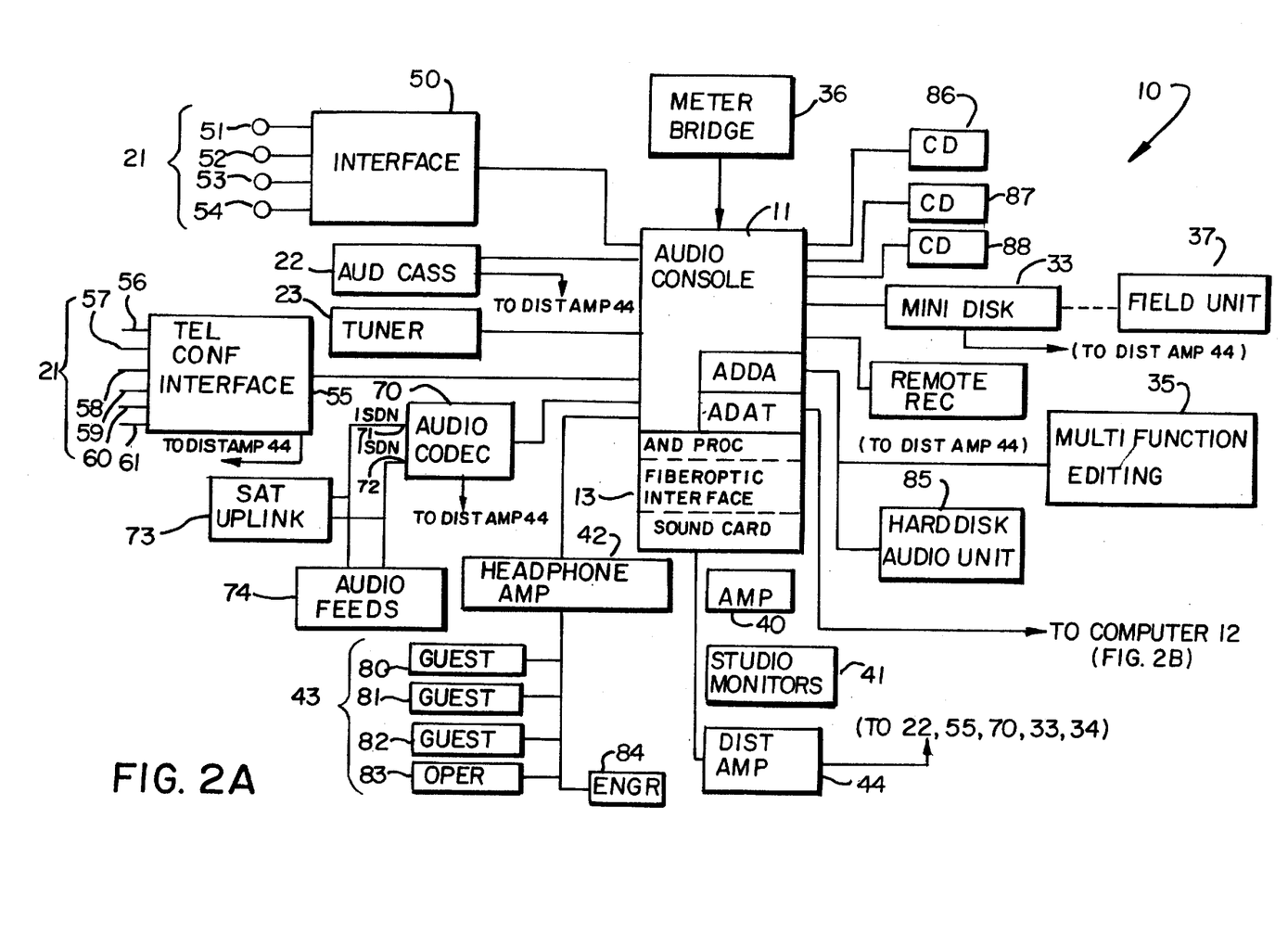
FIGS. 2A and 2B taken together set forth a more detailed block diagram of the present invention studio system.
Figure 2B:
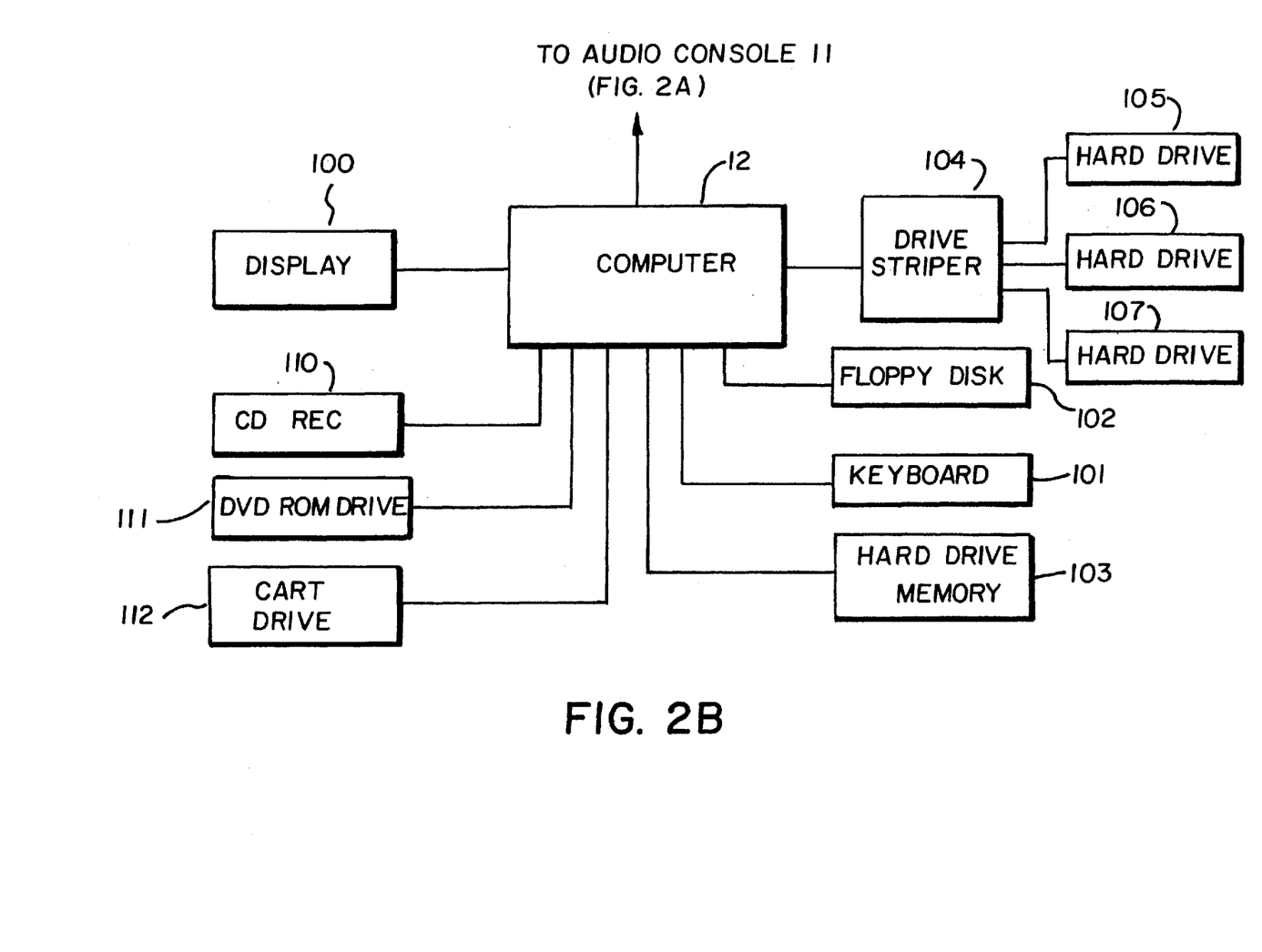

FIGS. 2A and 2B taken together set forth a more detailed block diagram of the preferred embodiment of the present invention audio production, satellite uplink and radio broadcast studio. An audio console 11 provides a digital mixing console which in the preferred fabrication of the present invention utilizes a Panasonic Ramsa DA7 digital mixing console. However, it will be understood by those skilled in the art that other equivalent apparatus which provides the functionality of console 11 may be utilized without departing from the spirit and scope of the present invention. Audio console 11 performs audio processing and includes internal fiber optic interface utilizing an internal Sonrus Studio sound card. In addition, audio console 11 includes internal ADAT and ADDA for communication between audio console 11 and both analog and digital devices and information sources. Audio console 11 further includes a meter bridge 36 which provides display of the audio information in a plurality of channels. Meter bridge 36 also sends and returns bus assignments (described below) for console 11 and apparatus coupled thereto. The utilization of audio console 11 in combination with meter bridge 36 assists the studio operator in locating signals both incoming and outgoing. In addition, the operator is able to utilize meter bridge 36 and console 11 to locate extraneous "unknown" signals such as noise, interference or the like.

To provide studio interviewing capability, a microphone interface 50 is operatively coupled to audio console 11 and receives information from a plurality of guest microphones 51, 52 and 53 together with a studio operator microphone 54. Interface 50 allows the simultaneous coupling of microphone signals from microphones 52 through 54 for processing by audio console 11. An audio cassette 22 preferably includes a dual cassette drive unit which is controlled by distribution amplifier 44 in a remotely controlled operation. The output from dual cassette unit 22 is also coupled to an input of audio console 11. A conventional tuner 23 which may, for example, include a Denon Tu-1500RD is operatively coupled to a convenient input of audio console 11. Tuner 23 is utilized in monitoring radio station broadcasts as well as recording and documenting local broadcasts as well as other miscellaneous functions.

To facilitate telephone conferencing and telephone interviewing within the host studio, audio console 11 is further coupled to a telephone conferencing interface 55. Interface 55 is remotely operated in response to distribution amplifier 44 and receives inputs from a plurality of telephone lines 56 through 61. In the preferred fabrication of the present invention, interface 55 may, for example, include a Telos 1×6 Hybrid interface and console. It will be apparent, however, that other equivalent apparatus may be utilized for interface 55 without departing from the spirit and scope of the present invention. With telephone lines 56 through 61 operatively coupled to interface 55 and with interface 55 operatively controlled in a remote fashion by distribution amplifier 44, the present invention system is able to record conversations with six telephone guests and, as is described below in greater detail, four in-studio speakers using microphones 51 through 54.

An audio codec 70 is operatively coupled to distribution amplifier 44 for remotely controlled operation. Codec 70 is coupled to a convenient input of audio console 11 and includes apparatus for compression and decompression of digitally encoded signals. While a variety of audio codec units may be utilized for audio codec 70, in the preferred fabrication of the present invention audio codec 70 utilizes a Telos Zephyr audio codec having stereo capability using ISDN dual channel BRI lines 71 and 72. ISDN lines 71 and 72 are further coupled to a conventional satellite uplink system 73 and a plurality of ISDN audio feed facilities 74.

Audio console 11 provides an audio output which is coupled to a headphone amplifier 42 which in turn is coupled to a plurality of guest headphones 80, 81 and 82 together with an operator headphone 83 and an engineer headphone 84. The function of headphone amplifier 42 and headphones 80 through 84 is provided to allow both guests and the system operator as well as a system engineer to conveniently monitor the outgoing audio information being processed by the studio system. In addition, an audio amplifier 40 which may, for example, include a power amplifier such as a Hafler model P3000 stereo amplifier is coupled to the sound card of audio console 11 and is utilized to drive a plurality of studio monitors (speakers) which supplements the audio monitoring provided by headphones 80 through 84. A distribution amplifier 44 is also coupled to console 11 and is operably coupled to audio cassette device 22, telephone conferencing interface 55, audio codec unit 70, mini-disc drive 33 and remote recording unit 34. Distribution amplifier 44 provides input signal to control the various interfaces and recording equipment to ensure that the information being processed is recorded within the appropriate recording unit or units.

In further accordance with the present invention, audio console 11 is operably coupled to computer 12 (seen in FIG. 2B). As described below, the entire system is operative under the control of a main computer (computer 12) which makes possible the single operator control and operation of the present invention studio. The operation of computer 12 is described below. However, suffice it to note here that computer 12 maintains, processes and operates the entire system under the control of a number of operating software programs resident within the memory of the main computer.

A hard disk audio unit 85 is operably coupled to the ADDA card within audio console 11. Hard disk audio unit 85 preferably provides a minimum of twenty-four hour storage capacity together with immediate delivery capability for preproduced stored audio information. In the preferred fabrication of the present invention, hard disk audio unit 85 may include a 360 Systems Instant Replay hard disk audio unit. However, it will be understood by those skilled in the art that other equivalent hard disk audio units may be utilized in place of hard disk unit 85 without departing from the spirit and scope of the present invention. A multi-function editing unit 35 is also coupled to the ADDA card within audio console 11. Multi-function editing unit 35 is used for phone editing (in real time or "on the fly") as well as post production editing and editing redundancy. In the preferred fabrication of the present invention, multi-function editing unit 35 may include a 360 Systems Shortcut Personal Audio Editor. However, other equivalent units may be utilized without departing from the spirit and scope of the present invention. In the preferred fabrication of the present invention, the 360 Systems Shortcut Personal Audio Editor utilizes SAW PRO software or its equivalent. It has been found that the use of multi-function editing unit 35 in the present invention system greatly enhances the ability of a single operator to edit phone interviews in real time during live broadcast. It has been further found that the post production and editing redundancy of multi-function editing unit 35 is also improved using the above-described personal editor unit.

A remote recording unit 34 is operatively coupled to distribution amplifier 44. Remote recording unit 34 allows the audio data to be recorded during guest interviews and telephone interviews or other audio information recording under the control of distribution amplifier 44 and audio console 11.

A mini-disc unit 33 is operatively coupled to audio console 11 and is coupled to distribution amplifier 44 for remote control operation. Mini-disc unit 33 operates in combination with a field unit 37. Field unit 37 is a portable unit which allows on-location recording of event information and remote site interviews and the like. In the preferred fabrication of the present invention, mini-disc unit 33 and field unit 37 utilize standard mini-discs or their equivalent. Mini-disc unit 33 may, for example, include a Sony MDS-E11 mini-disc unit having extended function remote capability. Field unit 37 may, for example, include a Marantz Model PMD650 mini-disc portable recording unit.

To provide music-based programming capability, a plurality of compact disc (CD) drives 86, 87 and 88 are coupled to inputs of audio console 11. Compact disc drives 86 through 88 may be entirely conventional in fabrication and may, for example, include a Denon Model DNC630 or its equivalent. The basic function of CD drives 86 through 88 is the provision of music from external sources housed on compact discs to facilitate music-based programming.

FIG. 2B sets forth a block diagram of the remainder of the present invention system and is primarily focused upon the controlling main computer of the present invention system. It will be recalled that FIGS. 2A and 2B taken together set forth a complete detailed block diagram of the present invention audio production satellite uplink and radio broadcast studio system. A main computer 12 is operably coupled to audio console 11 (seen in FIG. 2A). Computer 12 provides the main processor for the present invention system and stores and maintains the various software operating systems as well as user files. In addition, computer 12 provides information flow management and user input functions in accordance with conventional computer controlled system operation. While a number of computers may be utilized in fulfilling the function of computer 12 without departing from the spirit and scope of the present invention, it has been found advantageous to utilize a Pentium III 850 mhz processor together with 256 megabit RAM. Computer 12 further utilizes a chip set 440 motherboard and conventional SCSI controller. Computer 12 further utilizes a conventional display 100 which in the preferred fabrication of the present invention is provided by a high resolution cathode ray tube monitor or its equivalent. User input is further provided by a standard keyboard 101 and a conventional floppy disk drive 102.

Computer 12 utilizes a hard drive memory 103 for the storage of operating system software and user files. It has been found advantageous to utilize a hard drive memory for memory 103 such as a Maxtor IDE 30 Gigabyte 7200 RPM drive unit. It will be apparent to those skilled in the art however that other hard drive memory units having the required capacity and speed may be utilized for hard drive memory 103 without departing from the spirit and scope of the present invention. Computer 12 further utilizes a trio of high speed hard drive units 105, 106 and 107 in combination with a drive striper 104. Drive striper 104 and hard drives 105 through 107 cooperate to provide computer 12 with a substantial hard drive capacity for high speed high capacity or high bit rate processing. In essence, the operation of drive striper 104 utilizes hard drives 105, 106 and 107 in a manner which multiplies the individual drive capacities and drive speeds of hard drives 105 through 107 by a factor of three as seen by computer 12. While a variety of hard drive units may be utilized for hard drives 105 through 107, it has been found advantageous to utilize Cheetah 20 gigabyte 10000 RPM drives. As a result, the striping operation of drive striper 104 provides computer 12 with an effective processing memory of 60 gigabytes and effective drive speed of 30000 RPM.

A compact disc recorder 110 together with a digital video disc ROM drive 111 and a cartridge drive 112 are all operatively coupled to computer 12 by a common SCSI bus which is operably controlled by the internal SCSI controller of computer 12. Compact disc recorder 110 is operative to provide for "burning" conventional compact discs. Thus, once the desired program material has been assembled, edited and otherwise processed in the manner set forth below, the studio operator is able to transfer the program materials to a conventional compact disc using computer 12 and compact disc recorder 110. While a variety of conventional compact disc recorders may be utilized without departing from the spirit and scope of the present invention, it has been found advantageous to utilize a HP CD Writer Plus 9200 series compact disc recorder. Digital video disc ROM drive 111 is utilized to provide the present invention system with the ability to input audio information from digital video discs. Cartridge drive 112 provides backup capability for computer 12 and may, for example, utilize an Iomega Jazz 2 Gigabyte Zip drive unit or its equivalent.

In the preferred fabrication of the present invention, computer 12 utilizes a number of commercially available software operating systems and software programs to manage the operation of the present invention studio system. Thus, in its preferred fabrication, computer 12 operates under the control of software which includes IQS SAW PRR, Audio Catalyst, WS FTP PRO, Windows 2000, Office 2000 Premium, Adaptec CD and Creator and Norton Anti-Virus 2000 all of which are stored within hard drive memory 103.

Figure 3A:
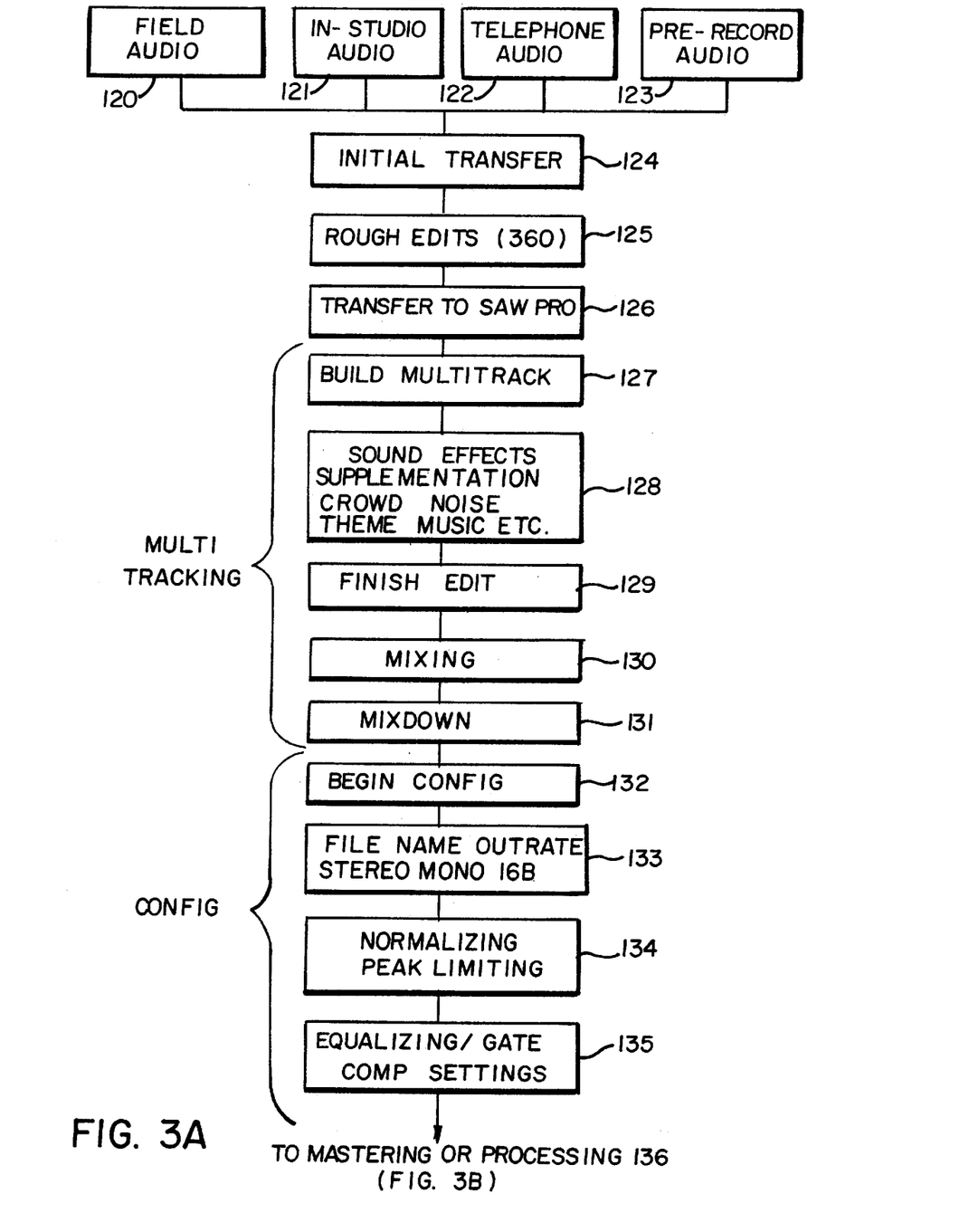
FIGS. 3A and 3B taken together set forth the operative flow diagrams of the present invention studio system.
Figure 3B:
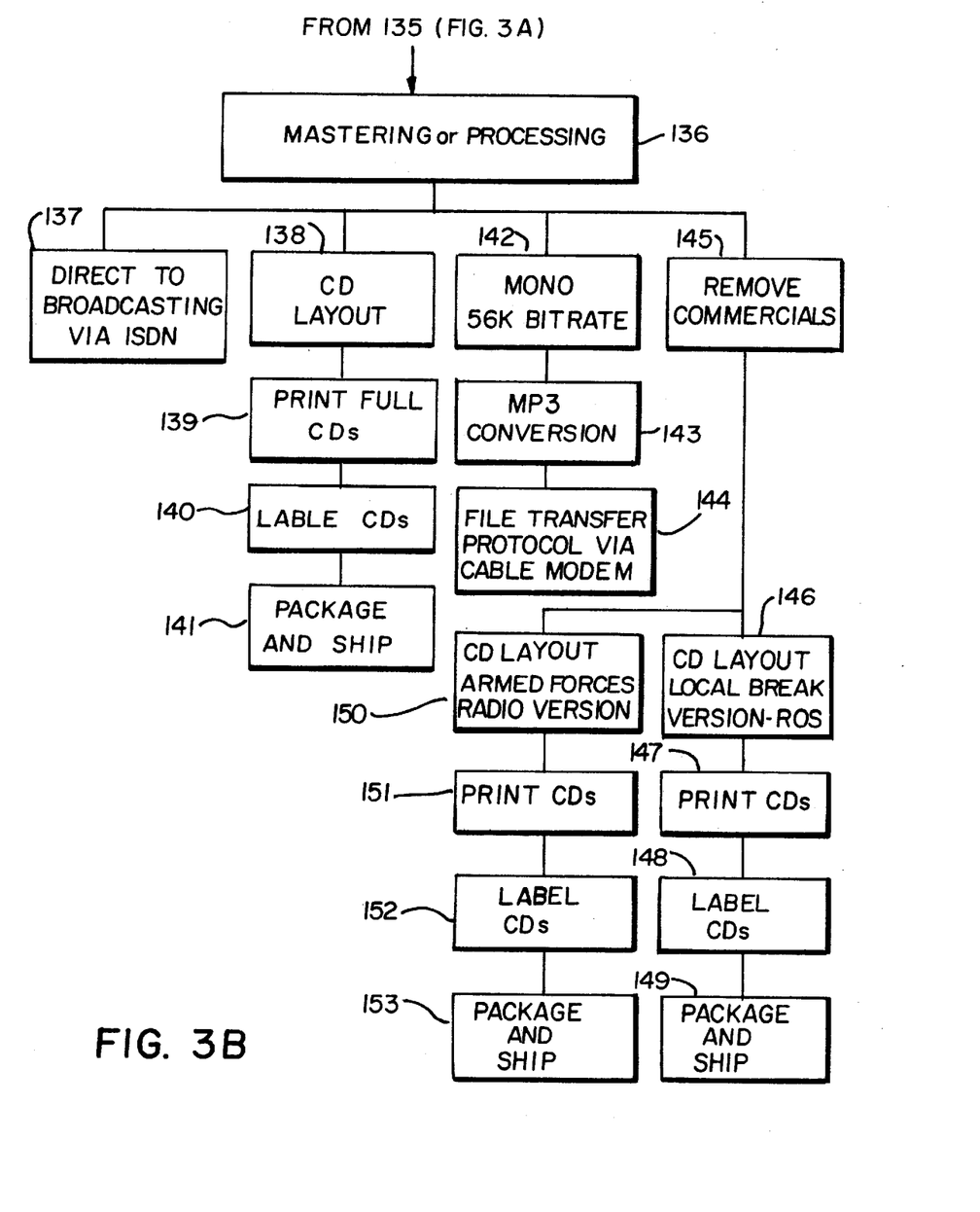

FIGS. 3A and 3B taken together set forth a flow diagram of the operation of the present invention studio system. Operation of the present invention audio production, satellite uplink and radio broadcast studio is initiated at one or more steps 120, 121, 122 or 123. Steps 120 through 123 involve assimilation of program material and content elements from one or more sources. By way of example, at step 120, program elements from field units such as field unit 37 (seen in FIG. 2A) provide so-called "field audio program elements". Similarly, at step 121, audio information and program elements collected within the studio itself provide so-called in-studio audio. Further, at step 122, information such as telephone interviews derived utilizing telephone lines 56 through 61 and telephone conferencing interface 55 (seen in FIG. 2A) provide information referred to as telephone audio. Finally, at step 123, additional audio material which has been previously recorded and stored within the studio system itself provides information referred to as pre-recorded audio. The various components of audio information from one or more of steps 120 through 123 is accumulated at an initial transfer step 124. Thus, in initial transfer step 124, various pre-existing audio segments and current production segments from the various sources are combined. Thereafter, at step 125, a rough edit is performed upon the various audio segments combined at step 124. This rough edit is performed primarily utilizing multifunction editing unit 35 (seen in FIG. 2A). As the name indicates, the rough edit performed at step 125 reduces the audio information to an approximate or rough collection of audio segments and components to be eventually utilized while removing all unnecessary or to-be-discarded elements or segments. Thereafter, at step 126, the material formed in rough edit step 125 is transferred to the above mentioned saw prosoftware in preparation for the multi-tracking function carried forward in steps 127 through 131. Once the audio segments and sub segments have been transferred to the saw pro-software, the system proceeds to a step 127 initiating the multi-tracking portion of the inventive process. In multi-tracking, several audio segments are arranged on a plurality of tracks displayed by meter bridge 36 and audio console 11 (seen in FIG. 2A). The multi-tracking of the audio segments allows independent adjustment and alteration of each audio segment and sub-segment as well as positioning or repositioning of selected audio segments and subsegments with the objective of building a production audio piece. Once the multi-track is built as step 127, the system proceeds to a step 128 in which additional material such as sound effects, supplemental information such as crowd noise or theme music and so on is added to the production piece being formed. Thereafter, at step 129, a finished edit is performed upon the combined now-forming production piece in which various audio segments and subsegments within their respective tracks in the multi-track configuration are subjected to a tighter and more stringent editing process. This process typically includes a final removal of all imperfections and a tighter assembly and time relationship between segments and sub-segments. Thereafter, at step 130, a mixing process is undertaken in which the various tracks having the segments and subsegments thereon are adjusted to cohesive levels to provide a coherent flow of segments and subsegments relative to each other. This avoids the undesired shift in volume levels which would otherwise occur as various segments are combined at mix down step 131. Within the mix-down, the multiple tracks are combined or "taken down" to form a pair of tracks suitable for stereophonic or dual channel audio information. At this point, the multi-tracking process set forth in steps 127 through 131 is complete and the program piece is essentially completed in its desired arrangement and selection of audio segments and sub-segments.

Steps 132 through 135 form the configuration or configuring portion of the operation of the present invention system. Initially at step 132, configuring of the output of mixdown step 131 is initiated. At step 133, a number of housekeeping operations are performed such as applying the appropriate file name, outrate, stereo/mono and so on are carried forward. Thereafter, at step 134, the process steps of normalizing and peak limiting are carried forward. During the normalizing process, the appropriate output volume level of the production piece is set within the controlling computer to maximize the use of compact disc capture mechanism and other processing apparatus. Consideration is given to criteria such as required bandwidth and volume levels and the like. In the peak limiting process, the maximum bandwidth perimeters to be processed are set within the controlling computer. Thus, the controlling computer is able to recognize the correct region of the audio waveform to be controlled for game control ect. Following the normalizing and peak limiting step 134, the system moves to a step 135 in which additional processes such as equalizing and gating levels of the controlling computer are set. In the gating process, an electronic gate level is set to establish the minimum audio level to be processed within the system. This minimum level allows the system to exclude unwanted audio information such as ambient noise or the like. At the completion at step 135, the configuring process has been completed and the operation moves to a mastering or processing step 136 (seen in FIG. 3B). Mastering or processing step 136, involves the definition of the finished equalization, normalization, peak limiting, compression, and gating prior to the final release of the production material. In essence, the mastering or processing step provides a final "fine tuning" or "fine polishing" of the production material. Once the material has received the mastering or processing at step 136, it may then be formatted for the desired use or mode of communication, transmittal or transfer to be utilized. At step 137, the mastered and processed program material from step 136 is formatted for direct communication to a broadcaster using ISDN communication lines 71 and 72 (seen in FIG. 2A). As mentioned above, ISDN communication may, in addition to direct feed to a broadcaster, be applied to satellite uplink 73 (seen in FIG. 2A) for alternative direct transmission to one or more broadcasters.

Steps 138 through 141 set forth the process by which the program material is applied to conventional compact discs which are then packaged and shipped to consumers such as radio broadcasters or the like. Thus, at step 138, a layout or arraignment for the compact disc to be formed is carried forward. At step 139, the compact discs are "burned" or imprinted with the program material. At step 140, suitable labels are applied to the compact discs and at step 141 the completed labeled compact discs are packaged and shipped.

Steps 142, 143 and 144 set forth alternative formatting of the mastered and processed program material formed in step 136 in which an MP3 configuration or format is utilized. MP3 formatting or configuring is utilized for consumers such as AM Radio Broadcast stations which receive their program material via internet delivery in a compressed format. The MP3 format converts processed files and date stamps the files such that the AM Radio Broadcast stations automated computer systems are able to access and play the program material. More specifically, at step 142, a manorial configuration at a 56K bit rate is utilized for formatting. Thereafter, at step 143, an MP3 conversion is carried forward afterwhich at step 144 the appropriate file transfer protocol for cable modem transfer to internet transmission is utilized.

Steps 145 through 153 set forth alternative formatting for the mastered and processed program materials in which the advertising or commercial portions are removed from the program materials due to consumers preference or requirements. Thus the commercial material is removed at step 145. Steps 146 through 147 set forth the final processing of program material having commercials removed therefrom which is suitable for run of schedule use by the radio broadcast station. The run of schedule format allows the local radio broadcast station to provide the desired commercial materials on a separate track for cut-in or insertion as desired. Accordingly, at step 146, the run of schedule or "ROS" version is arranged with a compact disc layout which provides for local breaks or gaps in the program material. These gaps are later used for cut-in of local commercial materials. Thereafter, at step 146, the resulting compact discs are burned or imprinted afterwhich at step 148 a suitable label is applied to each compact disc and at step 149 the compact disc or discs are packaged and shipped.

Steps 150 through 153 set forth an alternative formatting of the program material having the commercials or commercial materials removed therefrom at step 145. The format provided by steps 150 through 153 is suitable for use in environments in which the program materials are to be "commercial free". Thus, at step 150, a compact disc layout for continuous commercial free program materials is performed. Thereafter, at steps 151, 152 and 153 the compacts discs are burned or imprinted, suitably labeled and packaged for shipment.

What has been shown is an improved audio production, satellite uplink and radio broadcast studio designed and fabricated for operation by a single studio operator carrying forward the entire process of producing audio production materials. The improved studio allows the single operator to conduct a variety of audio program segment creation and collection including live telephone interviews, live in studio interviews, remote location interviews, special effects and stored audio segment use, as well as the combination editing, mixing, finishing and formatting processes to provide a complete program material output. The need to resort to additional facilities and/or additional locations is completely avoided by the improved studio system.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. A method for producing a radio production program piece comprising the steps of:

assembling a plurality of audio segments and subsegments;

performing a rough edit of said audio segments and subsegments to select some of said audio segments and subsegments from said plurality thereof;

forming and displaying a plurality of audio tracks having said selected audio segments and subsegments;

adding supplemental audio information to said plurality of audio tracks;

performing a finish edit of said plurality of audio tracks;

mixing said plurality of audio segments and subsegments;

performing a mixdown of said plurality of audio tracks to form a pair of audio tracks;

configuring said pair of audio tracks by normalizing, peak limiting, equalizing and gating processes; and mastering said pair of audio tracks after said configuring step and formatting said mastered tracks.

2. Radio program production means comprising:

means for assembling a plurality of audio segments and subsegments;

means for performing a rough edit of said audio segments and subsegments to select some of said audio segments and subsegments from said plurality thereof;

means for forming and displaying a plurality of audio tracks having said selected audio segments and subsegments;

means for adding supplemental audio information to said plurality of audio tracks;

means for performing a finish edit of said plurality of audio tracks;

means for mixing said plurality of audio segments and subsegments;

means for performing a mixdown of said plurality of audio tracks to form a pair of audio tracks;

means for configuring said pair of audio tracks by normalizing, peak limiting, equalizing and gating processes; and means for mastering said pair of audio tracks after configuring and formatting said mastered tracks.

* * * * *